No. 785,629. PATENTED MAR. 21, 1905.
G. D. MUNSING.
VEHICLE WHEEL.
APPLICATION FILED NOV. 18, 1904.
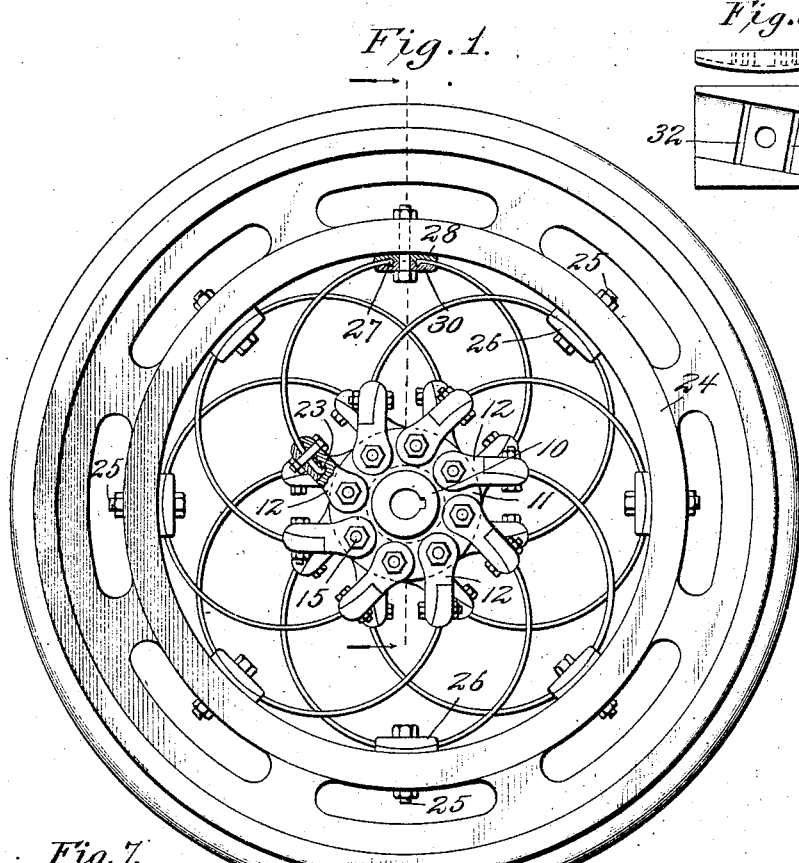
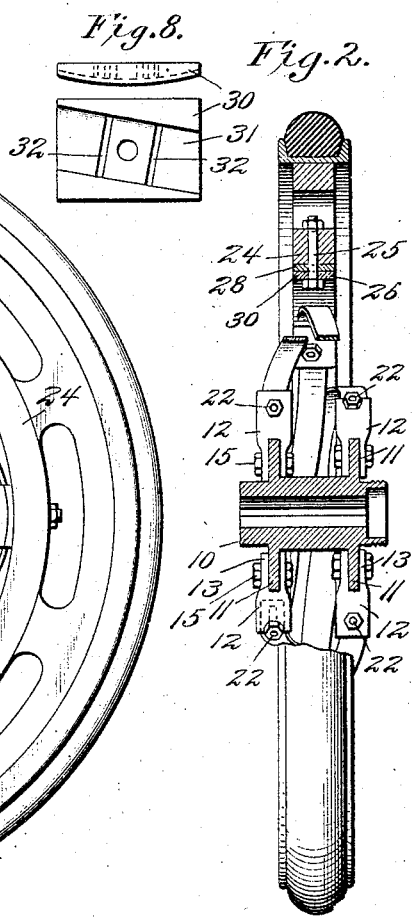
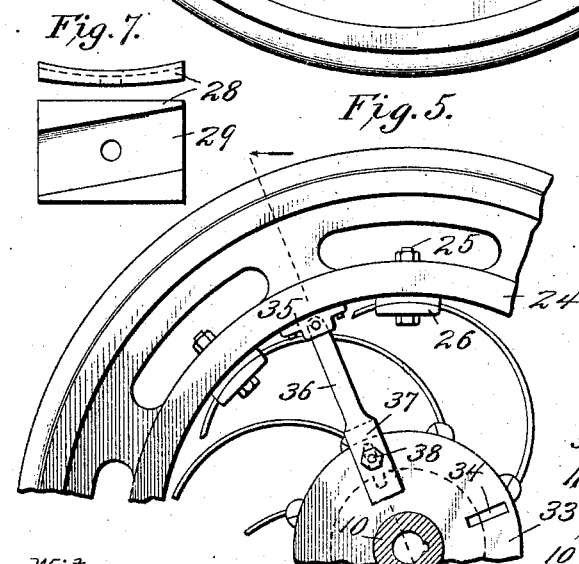
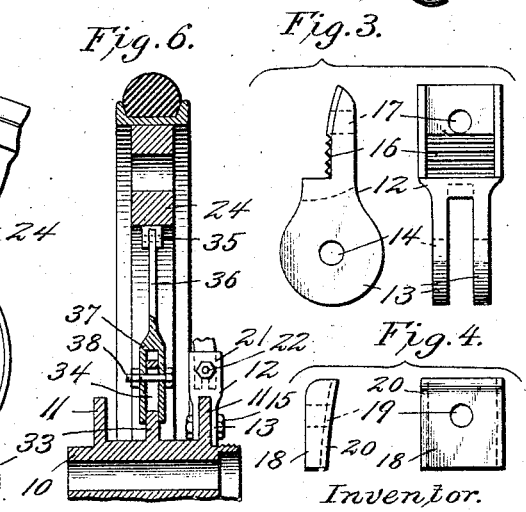
Witnesses.
Harry L. Amer.
Inventor.
George D. Munsing
by Henry Orth Jr.
attys.

No. 785,629. Patented March 21, 1905.

UNITED STATES PATENT OFFICE.

GEORGE D. MUNSING, OF NEW YORK, N. Y.

VEHICLE-WHEEL.

SPECIFICATION forming part of Letters Patent No. 785,629, dated March 21, 1905.

Application filed November 18, 1904. Serial No. 233,331.

*To all whom it may concern:*

Be it known that I, GEORGE D. MUNSING, a citizen of the United States, residing at the city of New York, in the county and State of New York, have invented certain new and useful Improvements in Vehicle-Wheels; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to vehicle-wheels, and more particularly to that class of wheels having spring-spokes, and has for its object to provide an adjustable hinged spoke and means connected to the rim and frictionally engaging the hub to prevent its radial displacement, with details of construction particularly described in the following description and set forth in the claims.

Referring to the drawings, in which like parts are similarly designated, Figure 1 is a side elevation of a wheel having adjustable hinged spring-spokes. Fig. 2 is a partial vertical central section. Figs. 3 and 4 are details of the hinge members. Fig. 5 is an elevation of the part of a wheel provided with friction devices. Fig. 6 is a section of Fig. 5. Figs. 7 and 8 are details of the securing member.

The wheel comprises a spool-shaped hub member 10, to whose flanges 11 are secured hinge members 12, having forks or ears 13, that straddle the flanges 11 of the spool-shaped hub. Each ear 13 has a bolt-hole 14, that registers with a similar hole in the hub-flange, so that a bolt 15 will pass through the two ears 13 of a hinge member and the hub-flange. Each hinge member 12 has a split upper end, one part being formed integral with the ears, having a portion of its face serrated, as at 16, and provided with a bolt-hole 17. The other part, 18, is independent, having a bolt-hole 19 to register with the one 17 and also has lateral flanges 20, between which the end of the spring-spoke rests. Each spoke is nearly semicircular, the hub end being forked, as at 21, Fig. 6, or it may be provided with a slot, both forms permitting the adjustment of the hub end of the spoke to and from the hub and at the same time permitting the bolt 22 to pass through it. Each spoke has a lug 23 on its end, either formed by an excess of metal or the end of the spoke is bent over. This lug takes into one of the notches or depressions between the serrations 16 in the member 12, and the portion 18 fits over the end, and the flanges 20 thereof embrace the sides of the spoke.

The bolt 22 is passed through the assembled parts and holds them in proper relative positions. By loosening the nut on the end of bolt 22 the member 18 is loosened sufficiently to enable the lug 23 on the hub end of the spoke to be shifted from one notch to another as requirements demand.

Through the felly 24 of the wheel pass bolts 25, that hold the securing members 26 for the outer ends of the spokes, each of which has a lug 27 on its outer end. These securing members are each composed of two pieces, one a chafing member 28, having a channel 29 therethrough at an angle to the length of said member, and a channel-shaped covering-plate 30, the channel 31 in which also runs at an angle to the length of said plate. Each covering-plate has two notches 32 transverse of the channel and into which the lugs 27 fit.

In the modification shown in Figs. 5 and 6 the hub is provided with a central flange 33, having radial slots 34. On the felly is secured a hinge member 35 opposite each slot, and in this member is pivoted one end of a friction-spoke 36, whose lower forked end 37 embraces the central flange 33. Passing through the tines of this fork and a slot 34 is a bolt 38 to hold the tines in frictional engagement with the center flange, so that the relative movement of felly and hub out of center by reason of their resilient spoke connection will be retarded and at the same time the extent of this movement will be limited by the movement of the bolt 38 in the slot 34.

Having thus described my invention, what I claim as new therein, and desire to secure by Letters Patent, is—

1. In a wheel, the combination with a hub and felly, of a member having a serrated face hinged to the hub, a spoke having a lug to engage a serration in said member and means to adjustably hold the lug in engagement with said member, substantially as described.

2. In a wheel, the combination with a hub and felly, of a member having a serrated face and hinged to the hub, a spoke having its end bent over to form a lug, and a plate adapted to hold the lug in engagement with a serration, substantially as described.

3. In a wheel, the combination with a felly and hub, of curved spring-spokes having one end rigidly secured to the felly, and two-part hinge members secured at both ends of the hub, the hub ends of the spokes adjustably secured between the parts of the hinge member, substantially as described.

4. In a wheel, the combination with a felly, spokes and a flanged hub; of hinge members, and bolts passing through a flange of the hub and through the hinge member to hinge the latter to the hub-flange, said member having a serrated portion engaged by the hub end of the spoke, and a plate adapted to take over the end of the spoke, substantially as described.

5. In a wheel, the combination with a felly, spokes and a flanged hub; of hinge members each comprising a pair of ears to straddle a flange of the hub and terminating in a serrated portion, a plate to cover the end of the spoke engaging the serrated portion, and a bolt passing through the plate, spoke and serrated portion, substantially as described.

6. In a vehicle-wheel, the combination with a curved spoke having forked hub ends provided with lugs; of a spool-shaped hub, a hinge member between each spoke and a hub-flange comprising a pair of perforated ears to straddle the flange of the hub, a bolt passing through the perforations and hub-flange, said hinge member having a serrated portion to be engaged by the lugs on the spoke, a plate to take over the hub end of the spoke and serrated portion of said member, and a bolt passing through the plate, forked end of the spoke and serrated portion of the member, substantially as described.

7. In a vehicle-wheel, the combination with a felly, a hub having a central flange; and spring-spokes between the felly and hub; of a friction device connected to the felly and in frictional engagement with the flange to retard the radial displacement of said hub, substantially as described.

8. In a vehicle-wheel, the combination with a felly and a hub having a central flange, and spring-spokes between the felly and hub; of a friction device secured to the felly and in frictional engagement with said flange, substantially as described.

9. In a vehicle-wheel, the combination with a felly and hub having a central flange; of spring-spokes connected to the felly and adjustably hinged to the hub, and a friction device secured to the felly and in frictional engagement with the flange to retard the radial displacement of the latter, substantially as described.

10. In a vehicle-wheel, the combination with a felly and a spool-shaped hub having a central flange; of spring-spokes secured to the felly, hinge members between the hub ends of the spokes and the heads of the spool-shaped hub and in which said spokes are radially adjustable, and a rigid friction member secured at one end to the felly and having a forked end in frictional engagement with the central flange of the hub, substantially as described.

In testimony that I claim the foregoing as my invention I have signed my name in presence of two subscribing witnesses.

GEORGE D. MUNSING.

Witnesses:
W. N. Camp,
S. W. Harrell.